(12) United States Patent
Dabak et al.

(10) Patent No.: US 8,059,746 B2
(45) Date of Patent: Nov. 15, 2011

(54) PRODUCING STTD DIVERSITY SIGNAL FROM RAKE COMBINED LEVEL 3 MESSAGE

(75) Inventors: Anand Ganesh Dabak, Plano, TX (US); Timothy M. Schmidl, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/470,241

(22) Filed: May 21, 2009

(65) Prior Publication Data
US 2009/0279634 A1 Nov. 12, 2009

Related U.S. Application Data

(62) Division of application No. 10/808,621, filed on Mar. 24, 2004, now Pat. No. 7,555,068, which is a division of application No. 09/373,855, filed on Aug. 13, 1999, now Pat. No. 6,728,302.

(60) Provisional application No. 60/119,732, filed on Feb. 12, 1999, provisional application No. 60/120,609, filed on Feb. 18, 1999.

(51) Int. Cl.
*H04B 7/02* (2006.01)
*H04L 1/02* (2006.01)

(52) U.S. Cl. ............. 375/267; 375/347; 375/348
(58) Field of Classification Search .......... 375/267, 375/299, 347, 284
See application file for complete search history.

(56) References Cited

U.S. PATENT DOCUMENTS

| | | | | |
|---|---|---|---|---|
| 5,088,113 | A * | 2/1992 | Wei | 375/280 |
| 5,475,677 | A * | 12/1995 | Arnold et al. | 370/280 |
| 5,809,019 | A * | 9/1998 | Ichihara et al. | 370/334 |
| 5,812,639 | A * | 9/1998 | Bartholomew et al. | 370/352 |
| 5,991,282 | A * | 11/1999 | Langlet et al. | 370/332 |
| 7,324,617 | B1 * | 1/2008 | Banerjee et al. | 375/347 |

* cited by examiner

*Primary Examiner* — Khanh C Tran
*Assistant Examiner* — Qutbuddin Ghulamali
(74) *Attorney, Agent, or Firm* — Lawrence J. Bassuk; W. James Brady; Frederick J. Telecky, Jr.

(57) ABSTRACT

A circuit is designed with a measurement circuit (746) coupled to receive an input signal from at least one of a first antenna and a second antenna of a transmitter. The measurement circuit produces an output signal corresponding to a magnitude of the input signal. A control circuit (726) is coupled to receive the output signal, a first reference signal ($\eta_1$) and a second reference signal ($\eta_2$). The control circuit is arranged to produce a control signal in response to a comparison of the output signal, the first reference signal and the second reference signal.

3 Claims, 7 Drawing Sheets

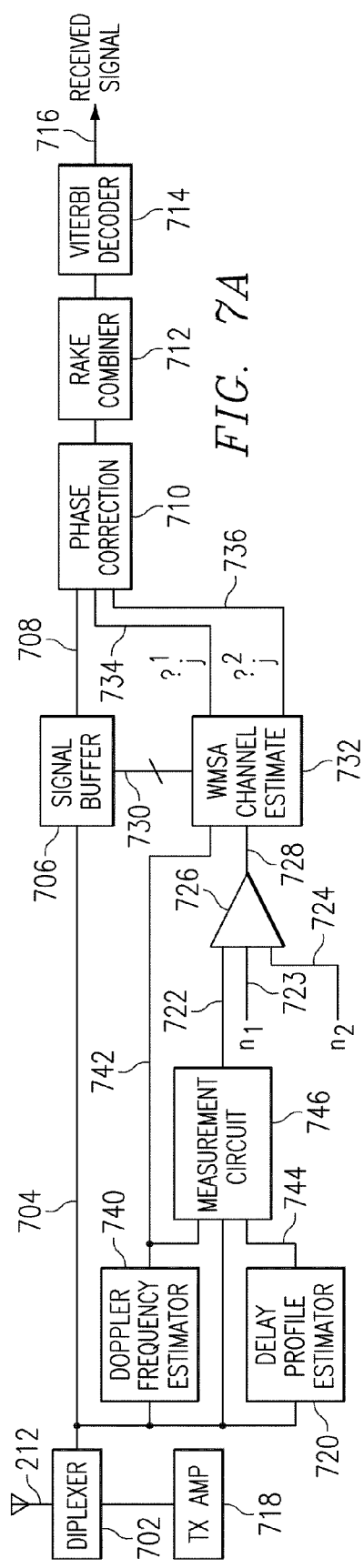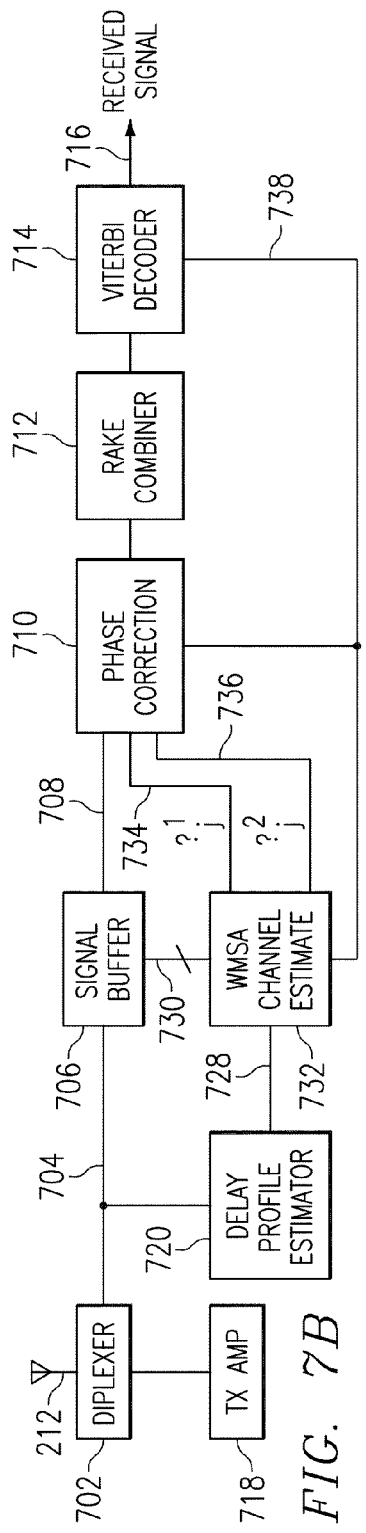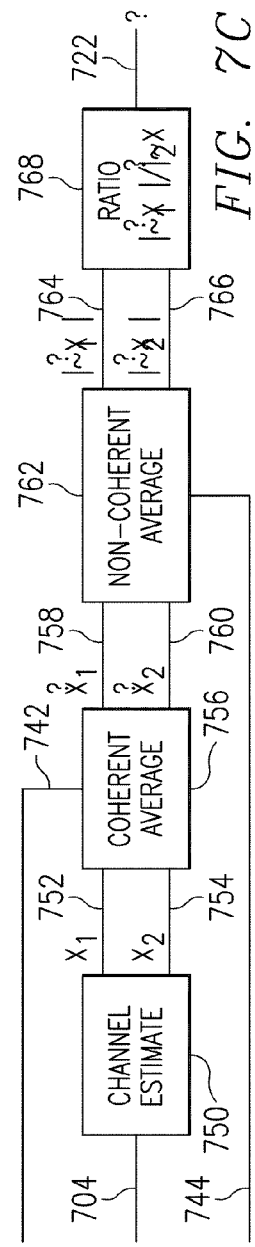

US 8,059,746 B2

PRODUCING STTD DIVERSITY SIGNAL FROM RAKE COMBINED LEVEL 3 MESSAGE

This application is a divisional of application Ser. No. 10/808,621, filed Mar. 24, 2004, now U.S. Pat. No. 7,555,068, issued Jun. 30, 2009;
Which is a divisional of application Ser. No. 09/373,855, filed Aug. 13, 1999, now U.S. Pat. No. 6,728,302, granted Apr. 27, 2004. Which claims priority under 35 U.S.C. .sctn. 119(e)(1) of provisional application No. 60/119,732, filed Feb. 12, 1999 and provisional application No. 60/120,609, filed Feb. 18, 1999.

FIELD OF THE INVENTION

This invention relates to wideband code division multiple access (WCDMA) for a communication system and more particularly to space-time transmit diversity (STTD) detection for WCDMA signals.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

Previous studies have shown that multiple transmit antennas may improve reception by increasing transmit diversity for narrow band communication systems. In their paper *New Detection Schemes for Transmit Diversity with no Channel Estimation*, Tarokh et al. describe such a transmit diversity scheme for a TDMA system. The same concept is described in *A Simple Transmitter Diversity Technique for Wireless Communications* by Alamouti. Tarokh et al. and Alamouti, however, fail to teach such a transmit diversity scheme for a WCDMA communication system.

New standards are continually emerging for transmit diversity of next generation wideband code division multiple access (WCDMA) communication systems as described in Provisional U.S. Patent Application No. 60/116,268, filed Jan. 19, 1999, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within range. The frames may propagate in a discontinuous transmission (DTX) mode. For voice traffic, transmission of user data occurs when the user speaks, but no data symbol transmission occurs when the user is silent. Similarly for packet data, the user data may be transmitted only when packets are ready to be sent. The frames are subdivided into sixteen equal time slots of 0.625 milliseconds each. Each time slot is further subdivided into equal symbol times. At a data rate of 32 KSPS, for example, each time slot includes twenty symbol times. Each frame includes pilot symbols as well as other control symbols such as transmit power control (TPC) symbols and rate information (RI) symbols. These control symbols include multiple bits otherwise known as chips to distinguish them from data bits. The chip transmission time ($T_C$), therefore, is equal to the symbol time rate (T) divided by the number of chips in the symbol (N).

A mobile unit must initially receive and synchronize with data frames transmitted by one or more remote base stations. Each base station continually transmits broadcast channel (BCH) data over the primary common control physical channel (PCCPCH) to identify itself to mobile units within the cell. Referring to FIG. 1, there is a simplified block diagram of a typical diversity transmitter of the prior art. The transmitter simultaneously transmits primary and secondary synchronization codes on respective primary (P-SCH) 150 and secondary (S-SCH) 160 channels to uniquely identify each base station signal received by the mobile unit. Circuits 156 and 166 modulate the gain of these synchronization codes in response to respective gain factors GP-SCH on lead 154 and GP-SCH on lead 164. Circuit 170 adds the synchronization codes and applies them to time switch (TSW) 174 via lead 172. Time switch 174 selectively applies the synchronization codes to switches SW0 134 and SW1 136 in response to the control signal at lead 140 as indicated by inset 190. These P-SCH and S-SCH codes are transmitted as symbol 300 (FIG. 3) in time slot 1.

Broadcast channel data (BCH) for the PCCPCH are applied to channel encoder 108 via lead 106 (FIG. 1). Interleaver circuit 110 applies the BCH data to space-time transmit diversity (STTD) encoder circuit 112. The STTD encoder produces encoded output data at lead 114 for the transmit antenna (Ant 1) and at lead 116 for the diversity antenna (Ant 2). Multiplex circuit 118 produces this STTD encoded BCH data on leads 120 and 122 at a time corresponding to data symbols 302 of time slot 1 (FIG. 3). The BCH data are modulated by spreading and scrambling codes on lead 124 and applied to switches SW0 134 and SW1 136. These switches SW0 and SW1 selectively multiplex SCH data with BCH data and pilot symbols in response to a control signal on lead 138 as shown at inset 190. The BCH data at lead 180 are then applied to the transmit antenna (Ant 1), and the data at lead 182 is applied to the diversity antenna (Ant 2).

Pilot symbol data for the PCCPCH are applied to lead 100. Diversity circuit 102 generates an open loop transmit diversity (OTD) symbol pattern at lead 104 for the diversity antenna. This OTD pattern together with the pilot symbol pattern for the transmit antenna is shown at TABLE I for each of the sixteen time slots in a frame. By way of comparison, the STTD pilot symbol pattern for diversity antenna (Ant 2) transmission on the dedicated physical data channel (DPDCH) is also shown. The pilot symbols at leads 100 and 102 are applied to multiplex circuit 118. Multiplex circuit 118 selectively applies the pilot symbols at leads 100 and 102 to leads 120 and 122, respectively, at a time corresponding to pilot symbols 304 of time slot 1 (FIG. 3). Thus, multiplex circuit 118 multiplexes STTD encoded data symbols 302 with OTD encoded pilot symbols 304. The pilot symbols at leads 120 and 122 are then modulated with spreading and scrambling code. These modulated pilot symbols at leads 130 and 132 are further multiplexed with SCH data by switches 134 and 136, respectively, in response to the control signal at lead 138 as shown at inset 190. The resulting pilot symbols are applied to transmit and diversity antennas via leads 180 and 182, respectively.

TABLE 1

| SLOT | \multicolumn{4}{c}{TRANSMIT ANTENNA} | | | | \multicolumn{4}{c}{STTD ANT 2} | | | | \multicolumn{4}{c}{OTD ANT 2} | | | |
|---|---|---|---|---|---|---|---|---|---|---|---|---|
| | $B_1$ | $S_1$ | $B_2$ | $S_2$ | $B_1$ | $-S_2^*$ | $-B_2$ | $S_1^*$ | $B_1$ | $S_1$ | $-B_2$ | $-S_2$ |
| 1 | 11 | 11 | 11 | 11 | 11 | 01 | 00 | 10 | 11 | 11 | 00 | 00 |
| 2 | 11 | 11 | 11 | 01 | 11 | 11 | 00 | 10 | 11 | 11 | 00 | 10 |
| 3 | 11 | 01 | 11 | 01 | 11 | 11 | 00 | 00 | 11 | 01 | 00 | 10 |
| 4 | 11 | 10 | 11 | 01 | 11 | 11 | 00 | 11 | 11 | 10 | 00 | 10 |
| 5 | 11 | 10 | 11 | 11 | 11 | 01 | 00 | 11 | 11 | 10 | 00 | 00 |
| 6 | 11 | 10 | 11 | 11 | 11 | 01 | 00 | 11 | 11 | 10 | 00 | 00 |
| 7 | 11 | 01 | 11 | 00 | 11 | 10 | 00 | 00 | 11 | 01 | 00 | 11 |
| 8 | 11 | 10 | 11 | 01 | 11 | 11 | 00 | 11 | 11 | 10 | 00 | 10 |
| 9 | 11 | 11 | 11 | 00 | 11 | 10 | 00 | 10 | 11 | 11 | 00 | 11 |
| 10 | 11 | 01 | 11 | 01 | 11 | 11 | 00 | 00 | 11 | 01 | 00 | 10 |
| 11 | 11 | 11 | 11 | 10 | 11 | 00 | 00 | 10 | 11 | 11 | 00 | 01 |
| 12 | 11 | 01 | 11 | 01 | 11 | 11 | 00 | 00 | 11 | 01 | 00 | 10 |
| 13 | 11 | 00 | 11 | 01 | 11 | 11 | 00 | 01 | 11 | 00 | 00 | 10 |
| 14 | 11 | 10 | 11 | 00 | 11 | 10 | 00 | 11 | 11 | 10 | 00 | 11 |
| 15 | 11 | 01 | 11 | 00 | 11 | 10 | 00 | 00 | 11 | 01 | 00 | 11 |
| 16 | 11 | 00 | 11 | 00 | 11 | 10 | 00 | 01 | 11 | 00 | 00 | 11 |

Turning now to FIG. 2, there is a block diagram showing signal flow in an OTD encoder 102 of the prior art for pilot symbol encoding of the transmitter of FIG. 1. The pilot symbols are predetermined control signals that may be used for channel estimation and other functions as will be described in detail. The OTD encoder 102 receives pilot symbols $B_1$, $S_1$, $B_2$ and $S_2$ at symbol times T-4T, respectively, on lead 100. These pilot symbols are applied to the transmit antenna (Ant 1) via multiplex circuit 118 and switch SW0 134 as previously described. The OTD encoder 102 simultaneously produces pilot symbols $B_1$, $S_1$, $-B_2$ and $-S_2$ at symbol times T-4T, respectively, at lead 104 for the OTD diversity antenna (Ant 2). The pilot symbol pattern for the transmit and OTD diversity antennas is shown at TABLE I for the sixteen time slots of a frame. Each symbol includes two bits representing a real and imaginary component. An asterisk indicates a complex conjugate operation or sign change of the imaginary part of the symbol. Pilot symbol values for the first time slot for the transmit antenna at lead 104, therefore, are 11, 11, 11 and 11. Corresponding pilot symbols for the second antenna at lead 104 are 11, 11, 00 and 00.

The bit signals $r_j(i+\tau_j)$ of these symbols are transmitted serially along respective paths 208 and 210. Each bit signal of a respective symbol is subsequently received at a remote mobile antenna 212 after a transmit time $\tau$ corresponding to the $j^{th}$ path. The signals propagate to a despreader circuit (FIG. 6) where they are summed over each respective symbol time to produce input signals $R_j^1$, $R_j^2$, $R_j^3$ and $R_j^4$ corresponding to the four pilot symbol time slots and the $j^{th}$ of L multiple signal paths.

The input signals corresponding to the pilot symbols for each time slot are given in equations [1-4]. Noise terms are omitted for simplicity. Received signals $R_j^1$, $R_j^2$, $R_j^3$ and $R_j^4$ are produced by respective pilot symbols $B_1$, $S_1$, $B_2$ and $S_2$. Average channel estimates $\hat{\alpha}_j^1$ and $\hat{\alpha}_j^2$ over the four pilot symbols for each antenna are obtained from a product of each received signal and a complex conjugate of its respective pilot symbol as in equations [5] and [6].

$$R_j^1=(\alpha_j^1+\alpha_j^2)B_1 \quad [1]$$

$$R_j^2=(\alpha_j^1+\alpha_j^2)S_1 \quad [2]$$

$$R_j^3=(\alpha_j^1-\alpha_j^2)B_2 \quad [3]$$

$$R_j^4=(\alpha_j^1-\alpha_j^2)S_2 \quad [4]$$

$$\hat{\alpha}_j^1=(B_1^*R_j^1+S_1^*R_j^2+B_2^*R_j^3+S_2^*R_j^4)/4 \quad [5]$$

$$\hat{\alpha}_j^2=(B_1^*R_j^1+S_1^*R_j^2-B_2^*R_j^3-S_2^*R_j^4)/4 \quad [6]$$

Referring now to FIG. 4, there is a simplified diagram of a mobile communication system of the prior art. The mobile communication system includes an antenna 400 for transmitting and receiving external signals. The diplexer 402 controls the transmit and receive function of the antenna. Multiple fingers of rake combiner circuit 404 combine received signals from multiple paths. Symbols from the rake combiner circuit 404, including pilot symbol signals, are applied to a bit error rate (BER) circuit 410 and to a Viterbi decoder 406. Decoded symbols from the Viterbi decoder are applied to a frame error rate (FER) circuit 408. Averaging circuit 412 produces one of a FER and BER. This selected error rate is compared to a corresponding target error rate from reference circuit 414 by comparator circuit 416. The compared result is applied to bias circuit 420 via circuit 418 for generating a signal-to-interference ratio (SIR) reference signal on lead 424.

Pilot symbols from the rake combiner 404 are applied to the SIR measurement circuit 432. The SIR measurement circuit produces a received signal strength indicator (RSSI) estimate from an average of received pilot symbols. The SIR measurement circuit also produces an interference signal strength indicator (ISSI) estimate from an average of interference signals from base stations and other mobile systems over many time slots. The SIR measurement circuit produces an SIR estimate from a ratio of the RSSI signal to the ISSI signal. This SIR estimate is compared with a target SIR by circuit 426. This comparison result is applied to TPC command circuit 430 via circuit 428. The TPC command circuit 430 sets a TPC symbol control signal that is transmitted to a remote base station. This TPC symbol instructs the base station to either increase or decrease transmit power by 1 dB for subsequent transmission.

Turning now to FIG. 5, there is a diagram showing a weighted multi-slot averaging (WMSA) circuit 732 of the prior art for channel estimation. In operation, a signal buffer circuit 706 (FIG. 7) receives individual frames of data having a predetermined time period of 10 milliseconds. Each frame of the PCCPCH is subdivided into sixteen equal time slots of 0.625 milliseconds each. Each time slot, for example time slot 528, includes a respective set of pilot symbols 520 and data symbols 529. The WMSA circuit (FIG. 5) samples pilot symbols from preferably 6 time slots for a Doppler frequency of less than 80 Hz and from preferably 4 time slots for a Doppler frequency of 80 Hz or more. These sampled pilot symbols are multiplied by respective weighting coefficients $\alpha_1$, through $\alpha_N$ and combined by circuit 526 to produce a channel estimate. This channel estimate is used to correct the phase of received data symbols in time slot 527 estimate for a respective transmit antenna.

Referring now to FIG. 6, there is a despreader circuit of the prior art. Received signals from mobile antenna 212 propagate to the despreader circuit where they are summed over each respective symbol time to produce output signals $R_j^1$ and $R_j^2$ corresponding to the $j^{th}$ of L multiple signal paths as previously described. The despreader circuit receives the $i^{th}$ of N chip signals per symbol together with noise along the $j^{th}$ of L multiple signal paths at a time $\tau_j$ after transmission. Both here and in the following text, noise terms are omitted for simplicity. This received signal $r_j(i+\tau_j)$ at lead 600 is multiplied by a channel orthogonal code signal $C_m(i+\tau_j)$ at lead 604 that is unique to the receiver. Each chip signal is summed over a respective symbol time by circuit 608 and produced as first and second output signals $R_j^1$ and $R_j^2$ on leads 612 and 614 as in equations [1-2], respectively. Delay circuit 610 provides a one-symbol delay T so that the output signals are produced simultaneously.

This arrangement advantageously provides additional gain at the mobile communication system by multiple path transmit antenna diversity from a remote base station. The mobile unit, however, must be compatible with base stations having a single transmit antenna as well as base stations having transmit antenna diversity. A problem arises, therefore, when the mobile communication system is initially powered up or when it passes from one cell to another cell. The mobile unit must not only determine which of several base signals offers a preferable signal strength. It must also determine whether the base station offers transmit antenna diversity. If the mobile unit incorrectly decodes a received signal and assumes no transmit diversity, it loses the improved gain of transmit diversity. Alternatively, if the mobile unit incorrectly decodes a received signal and assumes transmit diversity, multiple fingers of the rake combiner circuit 404 contribute noise to the received signal.

SUMMARY OF THE INVENTION

The foregoing problems are resolved by a circuit designed with a measurement circuit coupled to receive an input signal from at least one of a first antenna and a second antenna of a transmitter. The measurement circuit produces an output signal corresponding to a magnitude of the input signal. A control circuit is coupled to receive the output signal, a first reference signal and a second reference signal. The control circuit is arranged to produce a control signal in response to a comparison of the output signal, the first reference signal and the second reference signal.

The present invention detects a diversity transmit antenna. A control signal modifies receiver signal processing to correspond to the presence or absence of the diversity transmit antenna.

BRIEF DESCRIPTION OF THE DRAWINGS

A more complete understanding of the invention may be gained by reading the subsequent detailed description with reference to the drawings wherein:

FIG. 7A is a block diagram of a transmit diversity detection circuit of the present invention;

FIG. 7B is a block diagram of another embodiment of a transmit diversity detection circuit of the present invention;

FIG. 7C is a block diagram of the measurement circuit 746 of FIG. 7A;

DETAILED DESCRIPTION OF THE PREFERRED EMBODIMENTS

Figure 1:
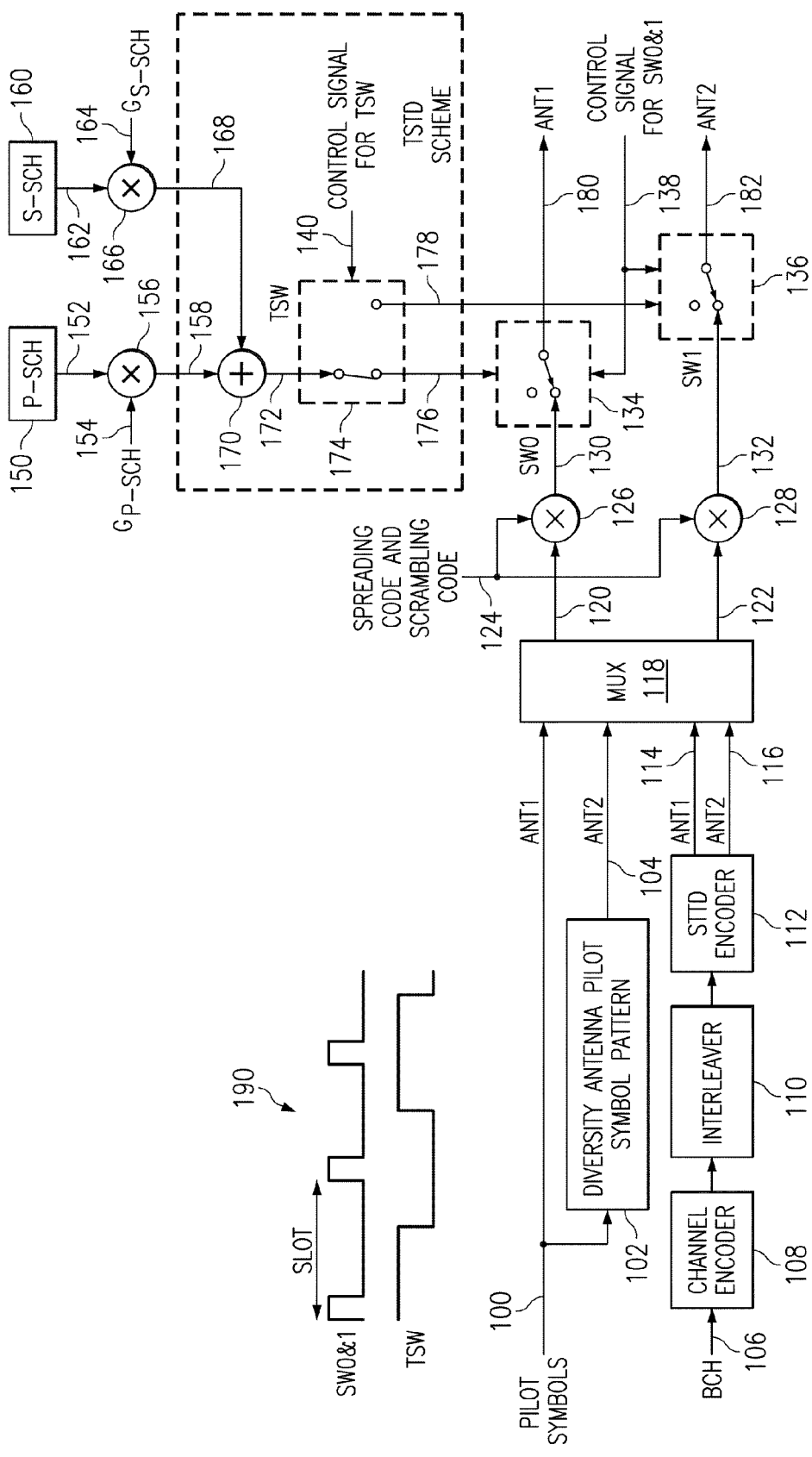
FIG. 1 is a simplified block diagram of a typical transmitter of the prior art using OTD encoded pilot symbols and STTD encoded data symbols for the PCCPCH.
Figure 2:
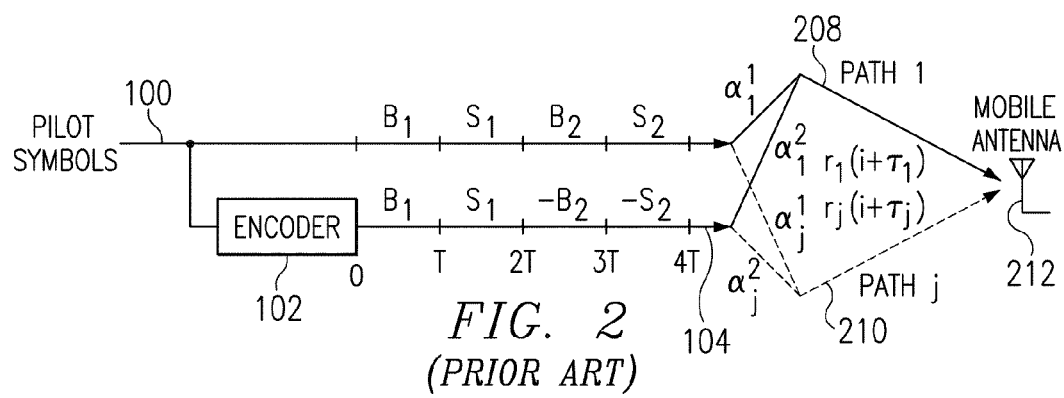
FIG. 2 is a block diagram showing signal flow of pilot symbol encoding in the OTD encoder of the transmitter of FIG. 1.
Figure 3:
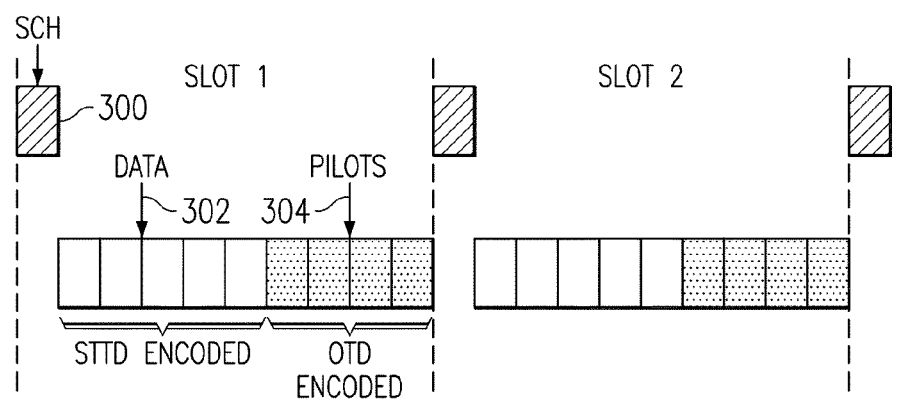
FIG. 3 is a diagram of pilot, data and search channel symbols of a PCCPCH time slot.
Figure 4:
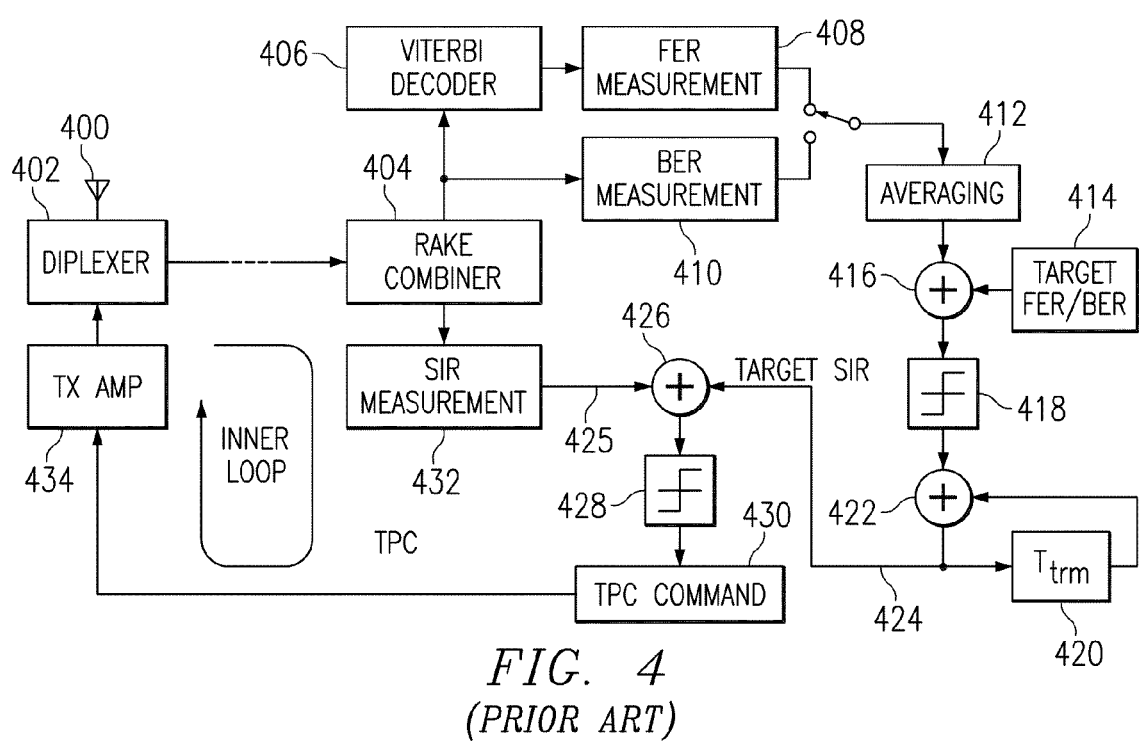
FIG. 4 is a simplified block diagram of a receiver of the prior art.
Figure 6:
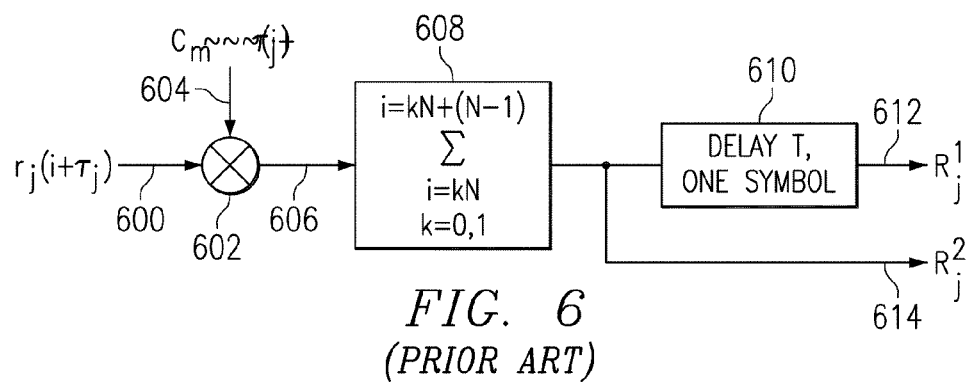
FIG. 6 is a schematic diagram of a despreader circuit of the prior art.

Referring now to FIG. 7A, there is a first embodiment of a mobile unit of the present invention configured for blind detection of transmit diversity. This blind detection scheme includes a new implementation of an algorithm disclosed by A. Wald, *Sequential Analysis* (1947). Mobile antenna 212 receives multipath signals transmitted by base station antennas at leads 180 and 182 (FIG. 1), respectively. Diplexer circuit 702 couples these received multipath signals to lead 704 during receive mode operation. Doppler frequency estimator circuit 740 is described in detail in copending U.S. patent application Ser. No. 09/224,632, filed Dec. 31, 1998, and incorporated herein by reference. Doppler frequency estimator circuit 740 receives the multipath signals on lead 704 and produces an output signal on lead 742 corresponding to the estimated Doppler frequency. Delay profile estimator circuit 720 also receives the multipath signals on lead 704. Delay profile estimator circuit 720 includes a despreader circuit as in FIG. 6 and a match filter circuit (not shown). The delay profile estimator circuit 720 determines which of the received multipath signals should be combined based on the strength of the matched filter output.

Operation of the measurement circuit 746 will now be explained in detail with reference to FIG. 7C. The measurement circuit 746 receives pilot symbol data from received multipath signals on lead 704. Channel estimate circuit 750 generates separate diversity signals $X_1$ and $X_2$, corresponding to antennas on leads 180 and 182, respectively. These separate diversity signals include pilot symbols from a series of time slots. Coherent averaging circuit 756 coherently averages the energy of all received pilot symbol data from the respective antennas at leads 180 and 182 from K time slots in response to the Doppler frequency estimator circuit output signal on lead 742 and produces signals $\tilde{X}_1$ and $\tilde{X}_1$ on respective leads 758 and 760. The variable K is preferably the same number of time slots used by the WMSA circuit of FIG. 5. It is preferably equal to six time slots for Doppler frequencies below 80 Hz and preferably equal to four time slots for Doppler frequencies of 80 Hz or more. Non-coherent averaging circuit 762 then non-coherently averages the signals $\tilde{X}_1$ and $\tilde{X}_1$ over the respective multipaths and produces signals $|\tilde{X}_1|$ and $|\tilde{X}_2|$ at leads 764 and 766, respectively, in response to the output signal on lead 744 from the delay profile estimator circuit. Ratio circuit 768 produces an output signal $\lambda$ at lead 722 that is a ratio of the signals $|\tilde{X}_1|$ and $|\tilde{X}_2|$ from the primary antenna at lead 180 and the diversity antenna at lead 182, respectively.

Comparator circuit 726 compares the output signal $\lambda$ at lead 722 to the first reference signal $\eta_1$ and the second reference signal $\eta_2$ at leads 723 and 724, respectively. These reference signals are programmed such that reference signal $\eta_1$ is greater than reference signal $\eta_2$. When output signal $\lambda$ is greater than reference signal $\eta_1$, the comparator circuit produces a control signal on lead 728 indicating no transmit diversity. This control signal is applied to WMSA channel estimate circuit 732. The WMSA channel estimate circuit sets the channel estimate $\alpha_j^2$ at lead 736 to zero, thereby eliminating any noise contribution to the received signal. Phase correction circuit 710 then applies the channel estimate $\alpha_j^1$ at lead 734 to the received signal at lead 708 from signal buffer 706. The phase correction circuit applies a corrected received signal from the primary antenna at lead 180 to rake combiner circuit 712. This rake combiner circuit then combines corrected multi-path signals from the primary antenna and applies the resulting combined signal to Viterbi decoder circuit 714. The Viterbi decoder produces a received signal at lead 716.

Alternatively, when output signal $\lambda$ is less than reference signal $\eta_2$, the ratio of signals from the primary and diversity antennas is near unity. The comparator circuit 726, therefore, produces a control signal on lead 728 indicating transmit diversity. The control signal is also applied to WMSA channel estimate circuit 732. The WMSA channel estimate circuit responsively produces channel estimate signals $\alpha_j^1$ and $\alpha_j^2$ at leads 734 and 736, respectively. Phase correction circuit 710 then applies both channel estimates to the received signal at lead 708 from signal buffer 706. The phase correction circuit then applies corrected signals from the primary antenna at lead 180 and the diversity antenna at lead 182 to rake combiner circuit 712. This rake combiner circuit then combines corrected multi-path signals from both antennas and applies the resulting combined signal to Viterbi decoder circuit 714. The Viterbi decoder produces a received signal at lead 716.

When output signal $\lambda$ is less than reference signal $\eta_1$ but greater $\eta_2$, the ratio of signals is indeterminate and comparator circuit 726 does not change the control signal on lead 728. Thus, WMSA channel estimate circuit continues to produce channel estimates corresponding to the previous state. Likewise, phase correction circuit 710, rake combiner 712 and Viterbi decoder 714 continue in the same mode of operation until output signal $\lambda$ exceeds the bounds of one of the reference signals, thereby indicating an unambiguous presence or absence of diversity. Furthermore, reference signal $\eta_1$ and $\eta_2$ preferably converge to a single value $\eta$ over time. This sequential convergence assures sequential detection of diversity or non-diversity over time.

Figure 8A:
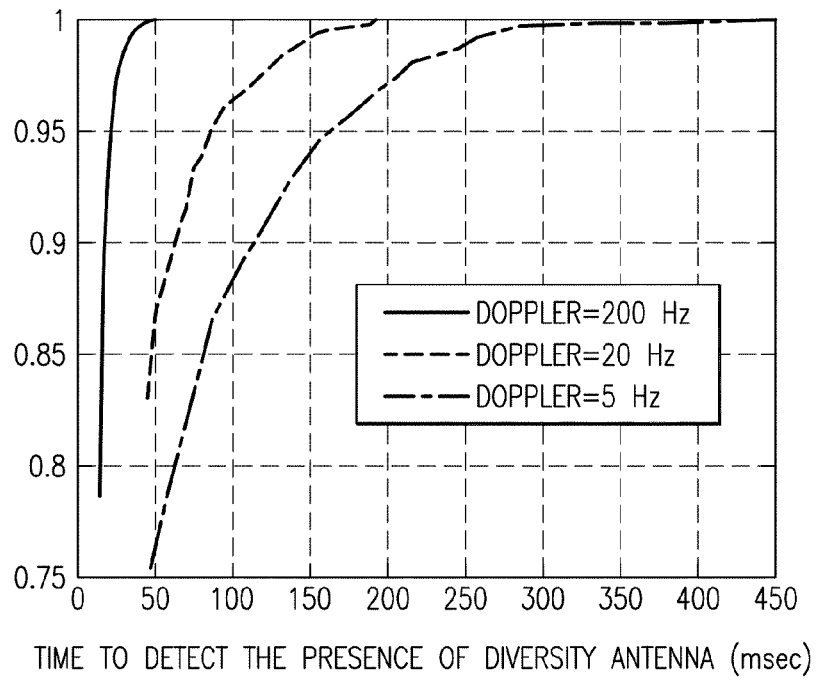
FIG. 8A is a simulation showing cumulative probability of detecting the presence of transmit diversity as a function of time for the embodiment of FIG. 7A.
Figure 8B:
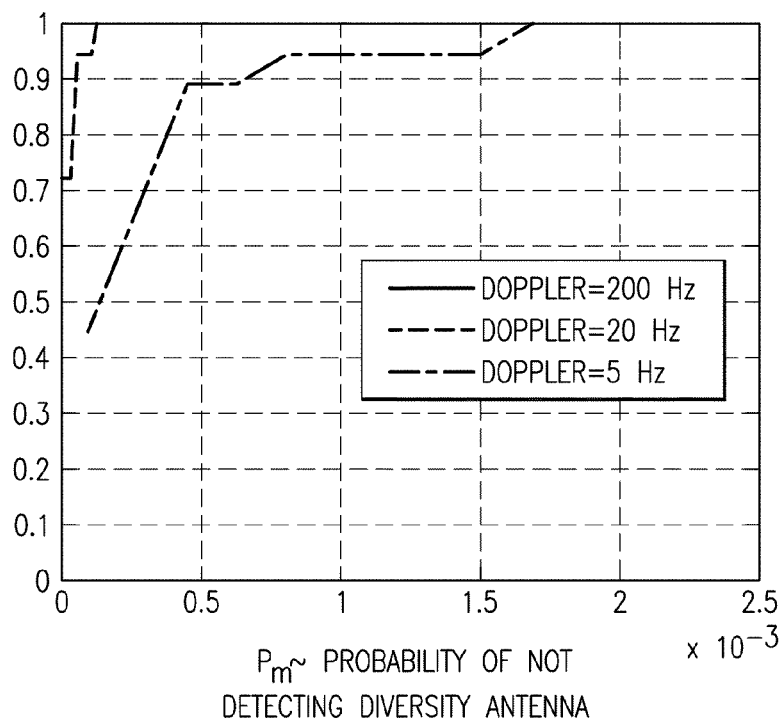
FIG. 8B is a simulation showing cumulative probability of not detecting transmit diversity when present for the embodiment of FIG. 7A.

The simulation output of FIG. 8A shows cumulative probability of detecting the presence of transmit diversity as a function of time for the embodiment of FIG. 7A. The simulation conditions include 40 traffic channels, each having a gain equal to the PCCPCH. Reference signals $\eta_1$ and $\eta_2$ converge to $\eta$ linearly over 48 frames for Doppler rates of 5 Hz and 20 Hz and over 24 frames for a vehicular Doppler rate of 200 Hz. The simulation shows 99% cumulative probability of detection of a diversity antenna at 250 milliseconds, 145 milliseconds and 30 milliseconds for Doppler frequencies of 5 Hz, 20 Hz and 200 Hz, respectively. The simulation of FIG. 8B shows cumulative probability $P_m$ of not detecting transmit diversity when present for the embodiment of FIG. 7A. The simulated probabilities are $1.7 \times 10^{-3}$ and $1.2 \times 10^{-4}$ for pedestrian Doppler frequencies of 5 Hz and 20 Hz, respectively. No error occurred at a 200 Hz Doppler frequency.

Figure 9A:
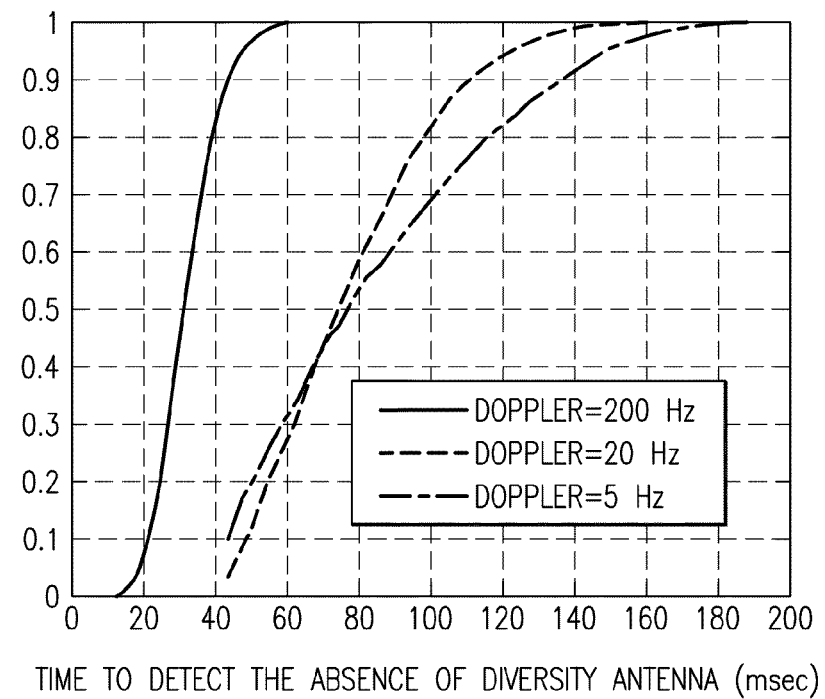
FIG. 9A is a simulation showing cumulative probability of detecting the absence of transmit diversity as a function of time for the embodiment of FIG. 7A.
Figure 9B:
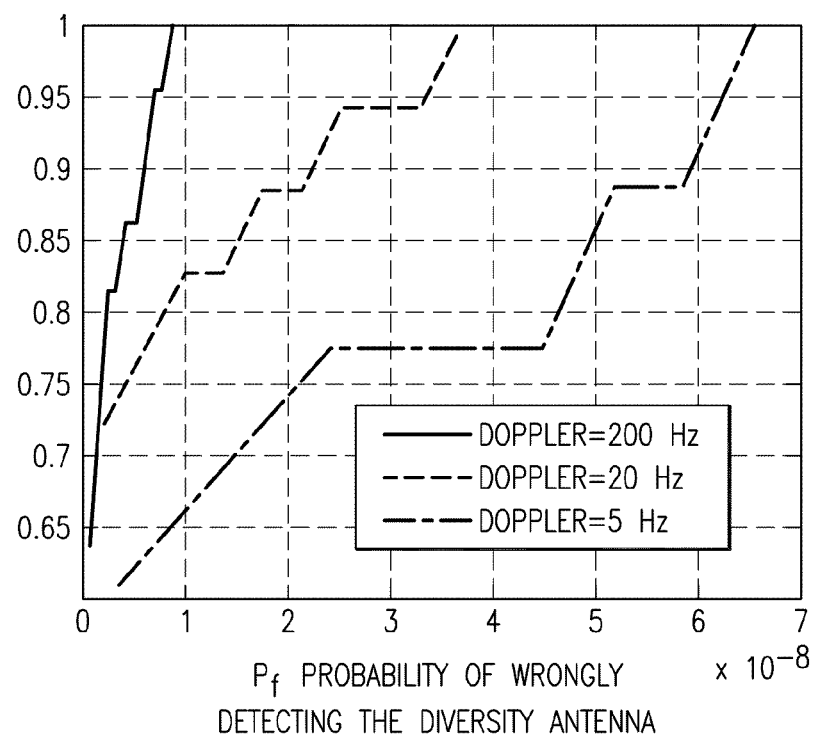
FIG. 9B is a simulation showing cumulative probability of detecting transmit diversity when absent.

The simulation output of FIG. 9A shows cumulative probability of detecting the absence of transmit diversity as a function of time for the embodiment of FIG. 7A. Under the same simulation conditions as FIG. 8, the simulation shows 99% cumulative probability of detecting the absence of a diversity antenna at 170 milliseconds, 140 milliseconds and 55 milliseconds for Doppler frequencies of 5 Hz, 20 Hz and 200 Hz, respectively. The simulation of FIG. 9B shows cumulative probability $P_f$ of detecting transmit diversity when not present for the embodiment of FIG. 7A. The simulated probabilities are $6.5 \times 10^{-3}$, $3.6 \times 10^{-3}$ and $6.1 \times 10^{-4}$ for Doppler frequencies of 5 Hz, 20 Hz and 200 Hz, respectively. No error occurred at a 200 Hz Doppler frequency.

The blind detection circuit of FIG. 7A, therefore, reliably detects the presence of transmit diversity in less than 250 milliseconds. Moreover, the probability of missing $P_m$ an active diversity antenna is less than $1.7 \times 10^{-3}$, and the probability of false detection $P_f$ of an absent transmit diversity antenna is less than $6.5 \times 10^{-3}$. This method of detection is highly advantageous when time permits. No special consideration is required at the base station to accommodate mobile detection. The mobile relies on a ratio of signals from the primary and diversity antennas for detection. Thus, decoding of transmitted signals is unnecessary for this method of blind detection.

Figure 5:
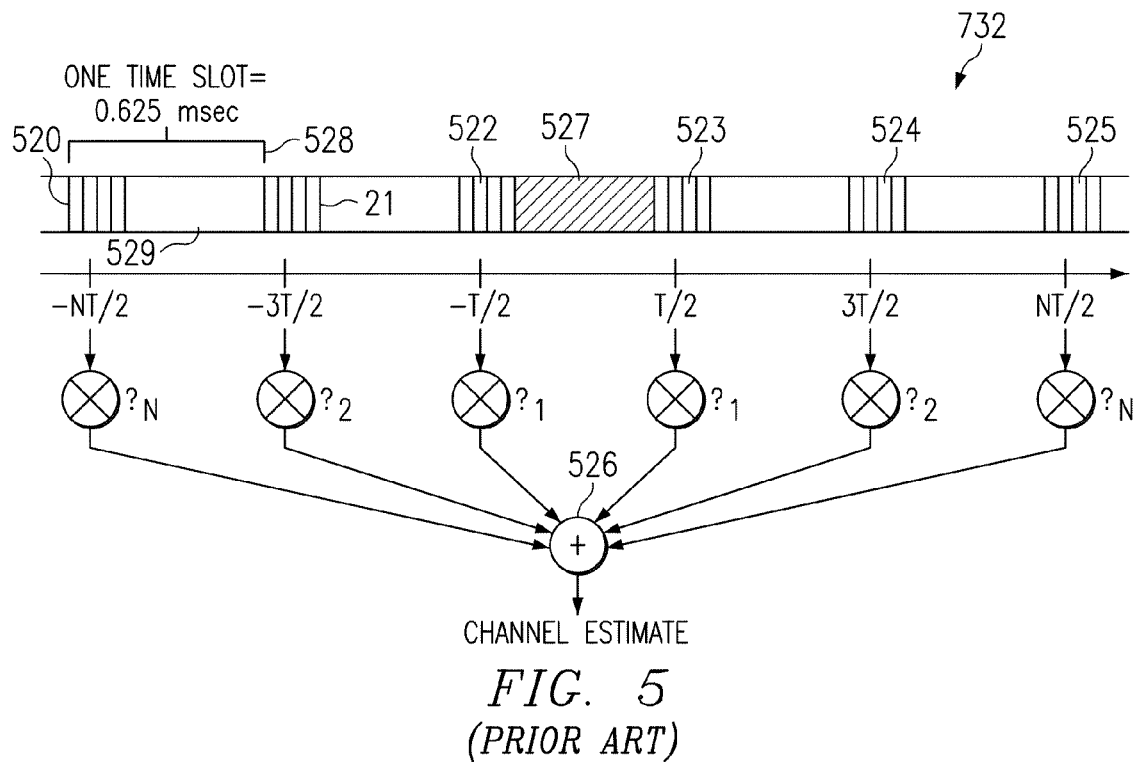
FIG. 5 is a block diagram showing weighted multi-slot averaging (WMSA) of the prior art.

Turning now to FIG. 7B, there is a second embodiment of a mobile unit of the present invention configured for Level 3 (L3) message detection of transmit diversity. This L3 message is a QPSK-encoded binary message that is transmitted on the PCCPCH together with other information such as whether the PCCPCH is STTD encoded, neighboring base stations, Secondary Common Control Physical Channel (SC-CPCH) offset and base station received power. The mobile unit applies received signals to the delay profile estimator circuit 720 and signal buffer circuit 706 as previously described. The delay profile estimator circuit applies a control signal corresponding to the Doppler rate of the received signal to the WMSA channel estimate circuit 732 via lead 728. This control signal determines the variable K number of time slots used by the WMSA channel estimate circuit 732 (FIG. 5). The mobile unit initially assumes the received signal is STTD encoded and produces a corresponding diversity control signal on lead 738. The diversity control signal enables production of channel estimate signals $\alpha_j^1$ and $\alpha_j^2$ at leads 734 and 736, respectively. Phase correction circuit 710 receives these channel estimate signals together with the data signals on lead 708 and produces a phase-corrected signal at rake combiner circuit 710. If the received data signal is STTD-encoded, the rake combiner circuit 712 combines multi-path data signals from the respective primary and diversity antennas and applies them to Viterbi decoder circuit 714. The Viterbi decoder circuit 714 decodes the L3 message to determine if the message contains information on STTD signal encoding of PCCPCH and produces diversity control signal on lead 738. If the L3 message contains information that the original PCCPCH data was STTD-encoded, operation of the receiver continues as previously described. Thus, the mobile unit with STTD realizes a typical 3 dB gain for a 5 Hz Doppler frequency corresponding to pedestrian indoor-to-outdoor transmission and a typical 0.6 dB gain for a 200 Hz Doppler frequency corresponding to vehicular transmission compared to non-diversity transmission.

When the L3 message includes information that the original PCCPCH data was not STTD-encoded, however, the Viterbi decoder circuit 714 changes the logic state of the control signal on lead 738. This non-diversity control signal on lead 738 disables the diversity channel estimate $\alpha_j^2$ on lead 736. The non-diversity control signal further disables the phase-corrected output from phase correction circuit 710, thereby eliminating noise at the rake combiner circuit 712 due to an absent diversity signal.

Figure 10A:
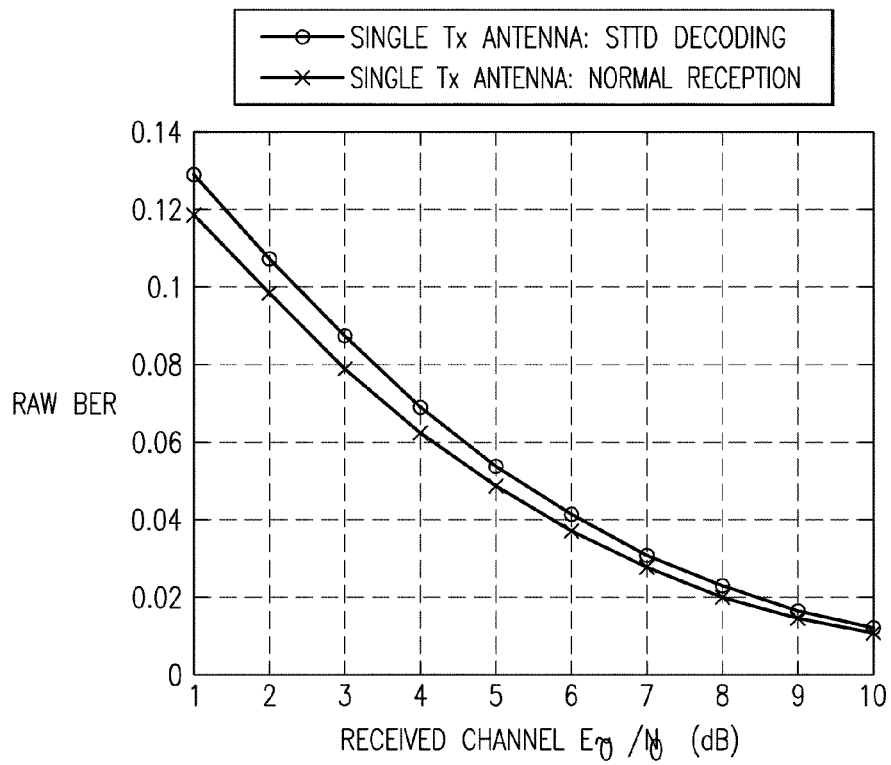
FIG. 10A is a simulation comparing normal and STTD decoding of single antenna transmission for a Doppler frequency of 5 Hz with weighted multi-slot averaging (WMSA)
Figure 10B:
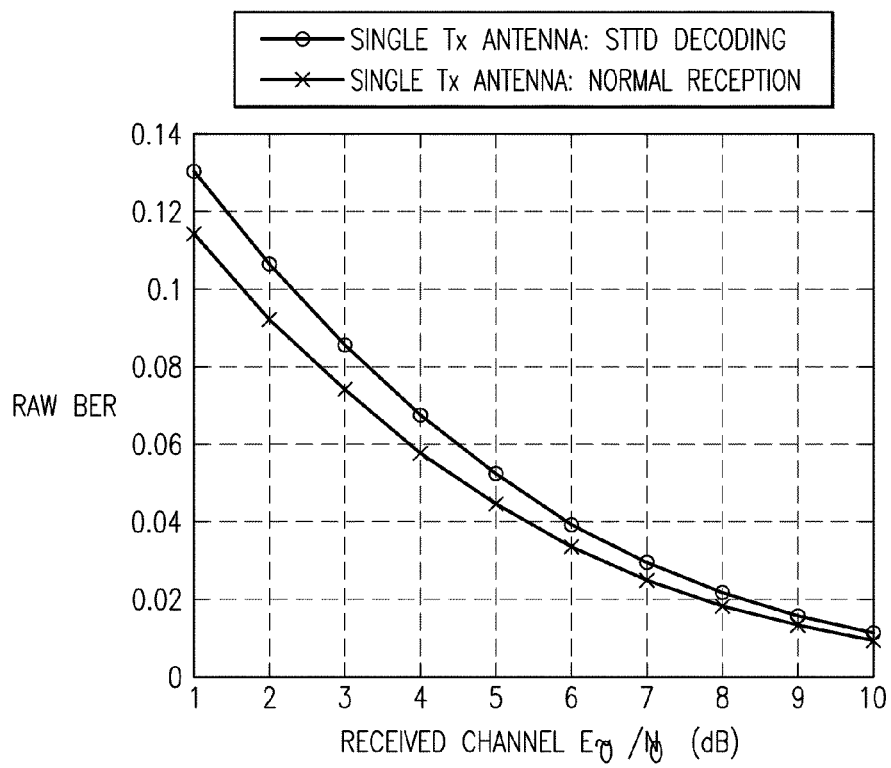
FIG. 10B is a simulation comparing normal and STTD decoding of single antenna transmission for a Doppler frequency of 200 Hz with weighted multi-slot averaging (WMSA).

The received L3 message is degraded at the mobile receiver when STTD signal encoding is incorrectly assumed prior to initial decoding. This degradation is due to noise at the rake combiner circuit fingers corresponding to the absent diversity antenna. The degradation due to this noise is shown at the simulated output of FIG. 10A. The simulation compares normal and STTD signal decoding of single antenna transmission for a Doppler frequency of 5 Hz with weighted multi-slot averaging (WMSA). The received channel energy to noise ratio ($E_0/N_0$) increases by only 0.2-0.4 dB for a selected bit error rate (BER). A comparable result is evident from the simulation comparing normal and STTD signal decoding of single antenna transmission for a Doppler frequency of 200 Hz with WMSA (FIG. 10B). The received channel energy to noise ratio ($E_0/N_0$) for this vehicular Doppler frequency of 200 Hz increases by 0.6-0.7 dB for a selected bit error rate (BER). A nominal degradation of the received channel energy to noise ratio ($E_0/N_0$) of 0.2-0.7 dB at the mobile unit will not inhibit correct demodulation of the L3 diversity message. This method of diversity detection is highly advantageous in reducing diversity detection time. The decoding of the information in the L3 message affirmatively indicates the presence or absence of diversity transmission at the output of the Viterbi decoder in less than 30 milliseconds. Only nominal signal degradation occurs by incorrectly decoding a non-diversity L3 message as though it were STTD signal encoded.

Although the invention has been described in detail with reference to its preferred embodiment, it is to be understood that this description is by way of example only and is not to be construed in a limiting sense. For example, advantages of the present invention may be achieved by a digital signal processing circuit utilizing a combination of hardware and software operations as will be appreciated by those of ordinary skill in the art having access to the instant specification. Furthermore, the advantages the blind detection method of signal diversity detection of FIG. 7A and the L3 message diversity detection of FIG. 7B may be combined. For example, the mobile unit may initially use the blind detection method to determine a presence or absence of transmit diversity. The result of this determination may then be used to decode the L3 message from the base station. The decoded L3 message may then be used to confirm the blind detection result. When results differ, however, the process may be repeated. In another embodiment of the present invention, the mobile unit may use either blind detection or L3 message decoding to determine a presence or absence of transmit diversity among neighboring base stations as well as a selected base station. In yet another embodiment of the present invention the mobile unit may receive transmit diversity information together with long code group information about neighboring base stations from the selected base station via L3 message decoding.

What is claimed is:

1. A process of detecting transmit diversity comprising:
  A. receiving a diversity encoded signal from a base station at an antenna of a mobile unit, the receiving occurring on a primary common control physical channel, and the signal carrying a message of information; and
  B. decoding the message carried by the received signal to determine transmit diversity signal encoding information contained in the message;
  C. the receiving including receiving a diversity encoded Level 3 message signal, and including:
    producing a first control signal corresponding to the Doppler rate of the received Level 3 message signal;
    producing two channel estimate signals in response to the first control signal and a diversity control signal indicating STTD diversity;
    enabling phase-correction of the Level 3 message signal by the two channel estimate signals in response to the diversity control signal;
    rake combining multipath data signals from the Level 3 message signal and the two channel estimate signals in response to the diversity control signal; and
    decoding the rake combined Level 3 message and producing the STTD diversity control signal indicating STTD diversity.

2. The process of claim 1 in which the decoding includes decoding information on neighboring base stations, secondary common control physical channel offset, and base station received power.

3. A process of detecting transmit diversity information contained in a Level 3 message, comprising:
  receiving a Level 3 message signal at an antenna of a mobile unit;
  producing a first control signal corresponding to the Doppler rate of the received Level 3 message signal;
  producing two channel estimate signals in response to the first control signal and a diversity control signal indicating STTD diversity, and one channel estimate signal in response to the first control signal and the diversity control signal indicating no STTD diversity;
  enabling phase-correction of the Level 3 message signal by the two channel estimate signals in response to the diversity control signal indicating STTD diversity and disabling the phase-correction of the Level 3 message signal in response to the diversity control signal indicating no STTD diversity;
  rake combining multipath data signals from the Level 3 message signal and the two channel estimate signals in response to the diversity control signal indicating STTD diversity, and from the Level 3 message and the one channel estimate signal in response to the diversity control signal indicating no STTD diversity; and
  decoding the rake combined Level 3 message and producing one of the diversity control signal indicating STTD diversity and the diversity control signal indicating no STTD diversity.

* * * * *